United States Patent
Sund et al.

(10) Patent No.: US 6,918,594 B2
(45) Date of Patent: Jul. 19, 2005

(54) FACE SEAL ASSEMBLY WITH COMPOSITE STATOR

(75) Inventors: Steven E. Sund, Ogdensburg, NJ (US); James V. Guiheen, Madison, NJ (US); Alan O. Lebeck, Albuquerque, NM (US); Raymond J. Knorr, Tempe, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/687,467

(22) Filed: Oct. 15, 2003

(65) Prior Publication Data

US 2004/0086380 A1 May 6, 2004

Related U.S. Application Data

(63) Continuation-in-part of application No. 09/782,865, filed on Feb. 13, 2001, now Pat. No. 6,655,695.

(51) Int. Cl.[7] .............................................. F16J 15/34
(52) U.S. Cl. ....................... 277/404; 277/358; 277/359; 277/360
(58) Field of Search ................................. 277/404, 358, 277/359, 360, 370, 399

(56) References Cited

U.S. PATENT DOCUMENTS

| | | |
|---|---|---|
| 4,948,151 A | 8/1990 | Janzen et al. |
| 5,143,384 A | 9/1992 | Lipschitz |
| 5,183,270 A | 2/1993 | Alten et al. |
| 5,411,368 A | 5/1995 | Chase et al. |
| 5,544,896 A | 8/1996 | Draskovich et al. |
| 5,626,347 A | 5/1997 | Ullah |
| 5,827,042 A | 10/1998 | Ramsay |
| 5,897,118 A * | 4/1999 | Ito et al. ...................... 277/393 |
| 6,131,797 A * | 10/2000 | Gasdaska et al. ......... 228/122.1 |
| 6,150,747 A | 11/2000 | Smith et al. |
| 6,322,081 B1 | 11/2001 | Ullah et al. |
| 6,450,762 B1 * | 9/2002 | Munshi ...................... 415/138 |
| 2002/0150486 A1 | 10/2002 | Cooper et al. |

FOREIGN PATENT DOCUMENTS

WO WO 02/064951 8/2002

* cited by examiner

Primary Examiner—Enoch Peavey
(74) Attorney, Agent, or Firm—Robert Desmond, Esq.

(57) ABSTRACT

A composite face seal has an annular seal rotor and an annular seal stator, both having a metal base portion and a radially extending flange. The flange has first and second axially facing surfaces. A first ceramic ring may be mounted to the first surface of the flange of either or both of the seal rotor and the seal stator by a first braze joint. A second ceramic ring may be mounted to the second surface of the flange of either or both of the seal rotor and the seal stator by a second braze joint. Each of the braze joints may include a molybdenum ring disposed between two braze rings or, for thicker seal assemblies, molybdenum and nickel rings disposed between braze rings.

57 Claims, 7 Drawing Sheets

FACE SEAL ASSEMBLY WITH COMPOSITE STATOR

CROSS-REFERENCE TO RELATED APPLICATIONS

This application is a continuation-in-part of U.S. application Ser. No. 09/782,865, filed Feb. 13, 2001, now U.S. Pat. No. 6,655,695.

BACKGROUND OF THE INVENTION

The present invention relates generally to face seal assemblies comprised of a rotating seal rotor and a stationary face seal stator for sealing along the rotating shaft of a gas turbine engine and, in particular, to an improved face seal assembly where at least one of the seal rotor and seal stator is a composite seal rotor and/or a composite seal stator.

Conventional face seal assemblies may be employed in gas turbine engines to prevent leakage of fluid along the engine's rotating shaft where the shaft extends through a wall or partition. These assemblies are comprised of a rotating component called a seal rotor and a non-rotating component called a seal stator. The seal stator is usually lightly spring loaded against the seal rotor.

Historically, various materials have been used for both the seal rotor and seal stator. For example, metals, carbon, ceramics, and other materials are mentioned in Zobens, U.S. Pat. No. 4,174,844; Floyd et al., U.S. Pat. No. 4,036,505; Fenerty et al., U.S. Pat. No. 3,926,443; and Stahl, U.S. Pat. No. 3,770,181. A common configuration is to have a metallic seal rotor and a carbon or graphite stator. A problem with these seals is that oil coking results from the friction between the seal rotor and the seal stator. Also, the carbon or graphite face seal tends to wear which requires that the engine be removed from service regularly to either inspect or replace the seal.

It is well known by those skilled in the art that a carbon or graphite seal stator will wear at a lower rate when rubbing against a ceramic surface as opposed to a metallic surface. Accordingly, one proposal for increasing the life of a conventional face seal assembly is to replace the metallic seal rotor with a ceramic seal rotor, (see for example Fenerty et al., teaching a seal assembly for a water pump in which one of the seal rings is ceramic, column 1, lines 50–55). However, such technology is not applicable to gas turbine engines because the rotating components in these engines are assembled in a lockup. This means that the rotating components (e.g., the compressor disks and turbine disks including the seal rotors) are first stacked one atop the other and then forced, and held together by a large compressive force. This compressive force produces concentrated tensile stresses on the sealing surfaces of the seal rotors abutting a rotating component. Because of its brittle nature conventional ceramic seal rotors tend to crack under these conditions.

To overcome the disadvantages associated with ceramic rotors while maintaining their benefits, Alten, U.S. Pat. No. 5,183,270, discloses a composite seal rotor having an inner metal ring for transmitting compressive forces and an outer ceramic ring for sealingly engaging the carbon face seal. A number of challenges were faced in designing this composite ceramic/metal seal assembly. First, the sealing surfaces must remain extremely flat over a typical operating temperature range of –65 to 400° F. This presents a problem for a composite seal rotor because the various materials combined in the composite have differing thermal expansion behavior which leads to distortion of the assembly during temperature changes. This distortion is sometimes referred to as coning or radial tapering of the sealing face. Second, the mechanism used to hold the metal and ceramic components together must provide sufficient adherence at all temperatures and hold the components together at high rotational speeds, including rotational speeds ranging between 35,000 and 160,000 RPM.

Gasdaska et al., U.S. Pat. No. 6,131,797, discloses a novel brazing method for attaching a metal part to a ceramic part. In particular, this patent discloses a braze joint that includes a layer of bar stock type molybdenum between first and second layers of ductile material. The first ductile layer is brazed to the metal and the second ductile layer is brazed to the ceramic. When the Gasdaska method is used in the formation of a face seal, the seal rotor ends up having seven layers (braze-nickel-braze-molybdenum-braze-nickel-braze) between the metal and ceramic. In many areas of gas turbine engines where face seals are employed, very little space is available making it difficult to use the multi-layer design of the Gasdaska patent.

As can be seen, there is a need for an improved composite face seal assembly that significantly improves performance of the face seal assembly while substantially reducing or eliminating problems with coking that may occur with graphite-to-steel mating surfaces.

SUMMARY OF THE INVENTION

An object of the present invention is to provide a composite face seal assembly that can be used in the small spaces normally found in gas turbine engines. Typically, when the ratio of the thickness of the joined members relative to the largest dimension of the joined members in the plane of the joint is less than ¼, the present invention is applicable.

The present invention meets this objective by providing a composite face seal comprising an annular seal rotor having a metal base portion and a radially extending flange with first and second axially facing surfaces. A first ring, which may be ceramic, may be mounted to the first surface of the flange by a first braze joint and a second ring, which may be ceramic, may be mounted to the second surface of the flange by a second braze joint. The composite face assembly may further include an annular stator having an axially facing surface that sealingly engages an axially facing surface of one of the ceramic rings.

In one embodiment of the present invention, each of the braze joints may comprise a molybdenum ring disposed between two braze rings. This embodiment of the seals may be particularly suitable for applications where space limits the axial dimension of the seal to a range of between 0.120 and 0.170 inches.

A second embodiment of the present invention may have an additional nickel ring disposed between the molybdenum ring and the base metal with braze rings between the nickel and the base metal. This embodiment of the seal can be used in applications where the axial dimension of the seal can be in the range of 0.170 to 0.220 inches.

A seal rotor is also disclosed. The seal rotor may have a metal base portion and a radially extending flange with first and second axially facing surfaces. A first ring, which may be ceramic, may be mounted to the first surface of the flange by a first braze joint and a second ring, which may be ceramic, may be mounted to the second surface of the flange by a second braze joint.

In one embodiment of this invention, each of the braze joints may comprise a molybdenum ring disposed between two braze rings. This embodiment of the rotor may be particularly suitable for applications where space limits the axial dimension of the rotor to a range of between 0.120 and 0.170 inches.

A second embodiment of this invention may have an additional nickel ring disposed between the molybdenum ring and the base metal with braze rings between the nickel and the base metal. This embodiment of the seal can be used in applications where the axial dimension of the rotor can be in the range of 0.170 to 0.220 inches.

In one aspect of the present invention, a face seal assembly for sealing between rotating components of a gas turbine engine mounted on a rotating shaft and a housing circumscribing the rotating components comprises an annular seal rotor adapted for mounting to the shaft, the seal having a metal base portion having a radially extending rotor flange with first and second axially facing rotor surfaces, and a first rotor ring mounted to the first axially facing rotor surface of the rotor flange by a first rotor braze joint; and an annular stator adapted for mounting to the housing, the stator having a metal base portion having a radially extending stator flange with first and second axially facing stator surfaces, and a first stator ring mounted to the first axially facing stator surface of the stator flange by a first stator braze joint; wherein one of said first and second axially facing rotor surfaces sealingly engages one of said first and second axially facing stator surfaces.

In another aspect of the present invention, a face seal assembly for sealing between rotating components of a gas turbine engine mounted on a rotating shaft and a housing circumscribing the rotating components comprises an annular seal rotor adapted for mounting to the shaft, the seal rotor having a metal base portion having a radially extending rotor flange with first and second axially facing rotor surfaces, a first rotor braze ring coupling the first axially facing rotor surface of the rotor flange to a first nickel rotor ring, a second rotor braze ring coupling the first nickel rotor ring to a first molybdenum rotor ring, a third rotor braze ring coupling the first molybdenum rotor ring to a first sealing rotor ring, a fourth rotor braze ring coupling the second axially facing rotor surface of the rotor flange to a second nickel rotor ring, a fifth rotor braze ring coupling the second rotor nickel ring to a second molybdenum rotor ring, and a sixth rotor braze ring coupling the second molybdenum rotor ring to a second rotor sealing ring; and an annular stator adapted for mounting to the housing, the stator having a metal base portion having a radially extending stator flange with first and second axially facing stator surfaces, a first stator braze ring coupling the first axially facing stator surface of the stator flange to a first nickel stator ring, a second stator braze ring coupling the first nickel stator ring to a first molybdenum stator ring, a third stator braze ring coupling the first molybdenum stator ring to a first sealing stator ring, a fourth stator braze ring coupling the second axially facing stator surface of the stator flange to a second nickel stator ring, a fifth stator braze ring coupling the second stator nickel ring to a second molybdenum stator ring, and a sixth stator braze ring coupling the second molybdenum stator ring to a second stator sealing ring; wherein one of the first and second axially facing rotor surfaces sealingly engages one of the first and second axially facing stator surfaces.

In a further aspect of the present invention, a face seal assembly for sealing between rotating components of a gas turbine engine mounted on a rotating shaft and a housing circumscribing the rotating components comprises an annular seal stator adapted for mounting to the housing, the seal stator having a metal base portion having a radially extending stator flange with first and second axially facing stator surfaces, a first stator ring mounted to the first axially facing stator surface of the stator flange by a first stator braze joint, and a second stator ring mounted to the second axially facing stator surface of the stator flange by a second stator braze joint; and an annular seal rotor adapted for mounting to the shaft and having an axially facing surface that sealingly engages one of the first stator ring and the second stator ring.

In another aspect of the present invention, a seal stator for use in a face seal assembly for sealing between rotating components of a gas turbine engine mounted on a rotating shaft and a housing circumscribing the rotating components comprises a metal base portion having a radially extending stator flange with first and second axially facing stator surfaces; a first ring mounted to the first axially facing stator surface of the stator flange by a first braze joint; and a second ring mounted to the second axially facing stator surface of the stator flange by a second braze joint.

In a further aspect of the present invention, a seal stator for use in a face seal assembly for sealing between rotating components of a gas turbine engine mounted on a rotating shaft and a housing circumscribing the rotating components comprises a metal base portion having a radially extending stator flange with first and second axially facing stator surfaces; a first braze ring coupling the first axially facing stator surface of the stator flange to a first nickel ring; a second braze ring coupling the first nickel ring to a first molybdenum ring; a third braze ring coupling the first molybdenum ring to a first sealing ring; a fourth braze ring coupling the second axially facing stator surface of the stator flange to a second nickel ring; a fifth braze ring coupling the second nickel ring to a second molybdenum ring; and a sixth braze ring coupling the second molybdenum ring to the second sealing ring.

In another aspect of the present invention, a method for sealingly engaging rotating components of a gas turbine engine mounted on a rotating shaft with a housing circumscribing the rotating components, comprises mounting an annular seal rotor onto the shaft, the seal rotor having metal base portion with a radially extended rotor flange having first and second axially facing rotor surfaces; mounting a first rotor ring to the first axially facing rotor surface of the rotor flange by a first rotor braze joint; mounting an annular stator adapted to the housing, the stator having a metal base portion with a radially extended stator flange having first and second axially facing stator surfaces; mounting a first stator ring to the first axially facing stator surface of the stator flange by a first stator braze joint; and sealingly engaging one of said first and second axially facing rotor surfaces with one of said first and second axially facing stator surfaces.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides a composite face seal comprising an annular seal rotor having a metal base portion and a radially extending flange with first and second axially facing surfaces. A first ring, which may be ceramic, may be mounted to the first surface of the flange by a first braze joint. A second ring, which may be ceramic, may be mounted to the second surface of the flange by a second braze joint. The composite face assembly further includes an annular stator having an axially facing surface that sealingly engages an axially facing surface of one of the ceramic rings. The stator may also have a metal base portion and a radially extending flange with first and second axially facing surfaces. A first ring, which may be ceramic, may be mounted to the first surface of the flange by a first braze joint. A second ring, which may be ceramic, may be mounted to the second surface of the flange by a second braze joint.

The hybrid rotor and/or stator design of the present invention provides robustness, toughness, strength, life and reliability for the high speed operating environment of an aircraft borne gas turbine engine, including the stress and deflection field from the loading clamp, centrifugal force and thermal environment. Use of this hybrid rotor and/or stator offers the best of both worlds of metal and ceramic as applied to face seal assemblies. Specifically, the present invention offers the roughness and robustness of a nearly all metal design as well as the tribological benefits, thermal benefits (high thermal conductivity) and distortion benefits (high elastic modulus) of ceramic.

In contrast to the present invention, conventional face seal assemblies use a metallic seal rotor and a carbon or graphite stator. A problem with these seals is that oil coking results from the friction between the seal rotor and the seal stator. Also, the carbon or graphite face seal tends to wear which requires that the engine be removed from service regularly to either inspect or replace the seal.

Figure 1:
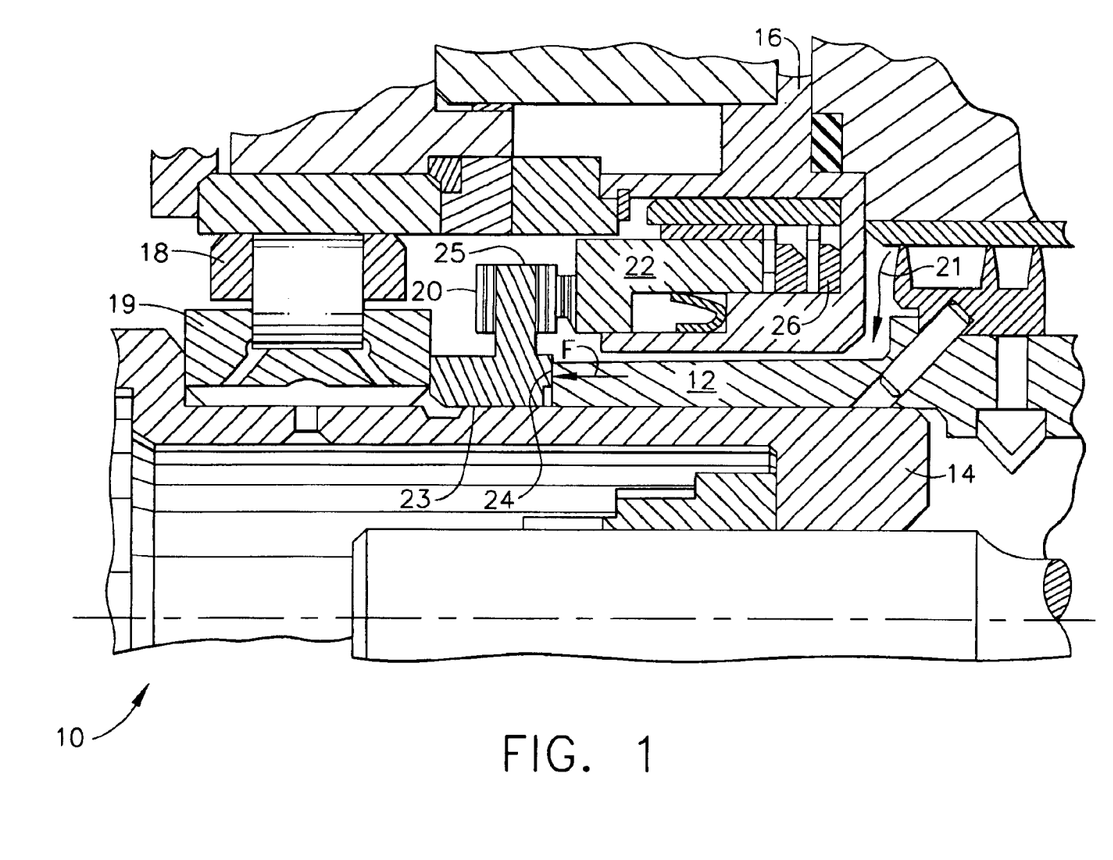
FIG. 1 is a cross-sectional view of a portion of a gas turbine engine capable of employing the face seal assembly of the present invention.
Figure 2:
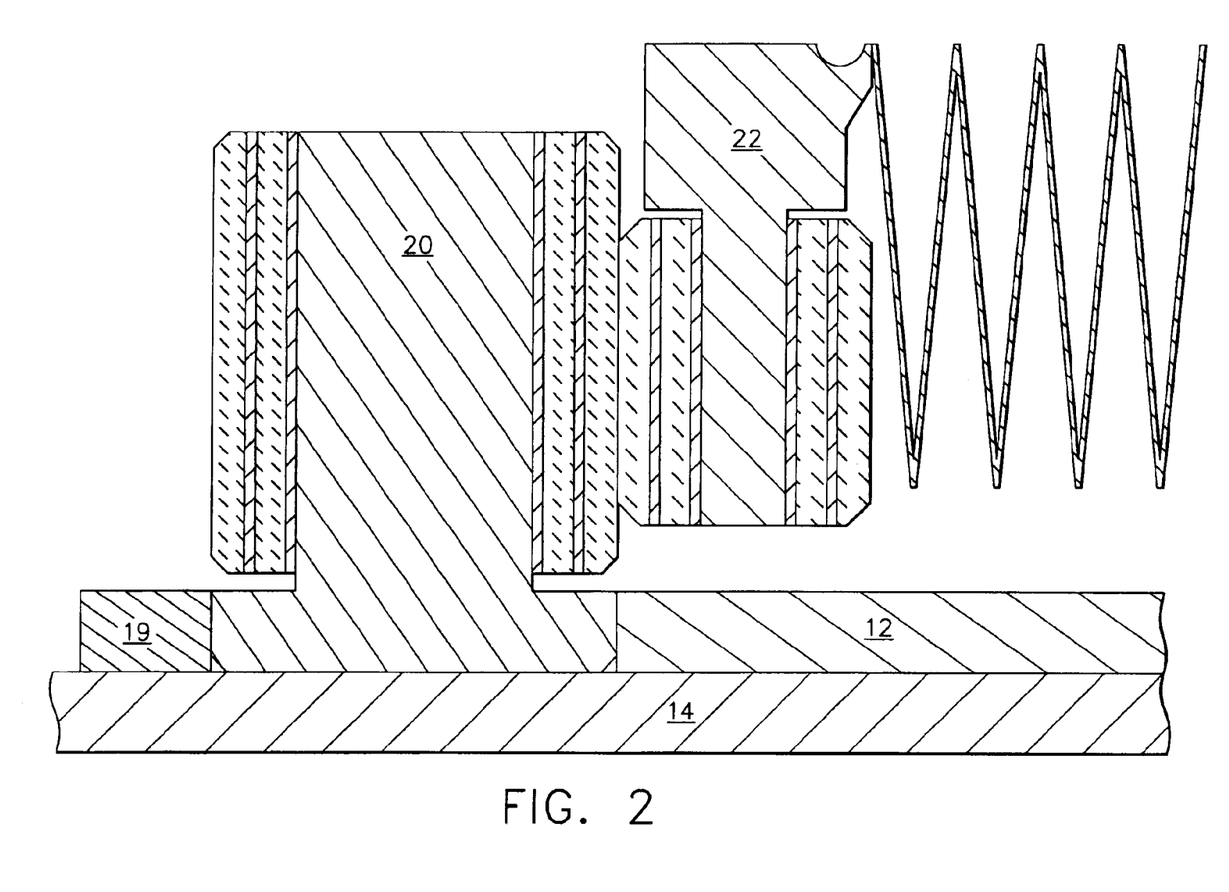
FIG. 2 is a schematic view of a composite seal rotor and composite stator according to an embodiment of the present invention.

Referring to FIGS. 1 and 2, there is shown a compressor section of a gas turbine engine generally denoted by the reference numeral 10. Gas turbine engine 10 may include a rotating compressor disk 12 coupled to a rotating shaft 14. A stationary housing 16 may circumscribe shaft 14. Housing 16 may be mounted atop a bearing 18 having an inner race 19 which may be mounted on shaft 14. A seal rotor 20, mounted for rotation on shaft 14, may have a base portion 23 that abuts at one axial end with inner race 19 and at the other axial end 24 with compressor disk 12. A portion of housing 16 may circumscribe a portion of compressor disk 12 to define a leakage path, (referenced by arrow 21) there between. A non-rotating seal stator 22 may be mounted within housing 16 and positioned to abut an upper portion 25 of seal rotor 20 to seal leakage path 21. A spring 26 may force seal stator 22 into sealing engagement with upper portion 25 of rotor seal 20. Because of the lockup assembly of engine 10 containing the compressor section, a compressive force, represented by arrow F, of about 30,000 lbs. for example, may be transmitted from compressor disk 12, through base portion 23 of seal rotor 20, to inner race 19. By creating a balanced rotor and stator, that is, a rotor and stator having their sealing and non-sealing faces made of the same interlayer laminate structure, coning caused by differential expansion between the rotor and stator can be controlled and/or eliminated. By balancing the rotor and stator in this manner, differential thermal expansion on the two sides of the stator and rotor may be reduced or eliminated, thereby nullifying the net rotational distortion of the cross section about the circumferential axis of the face seal assembly (coning).

Figure 3:
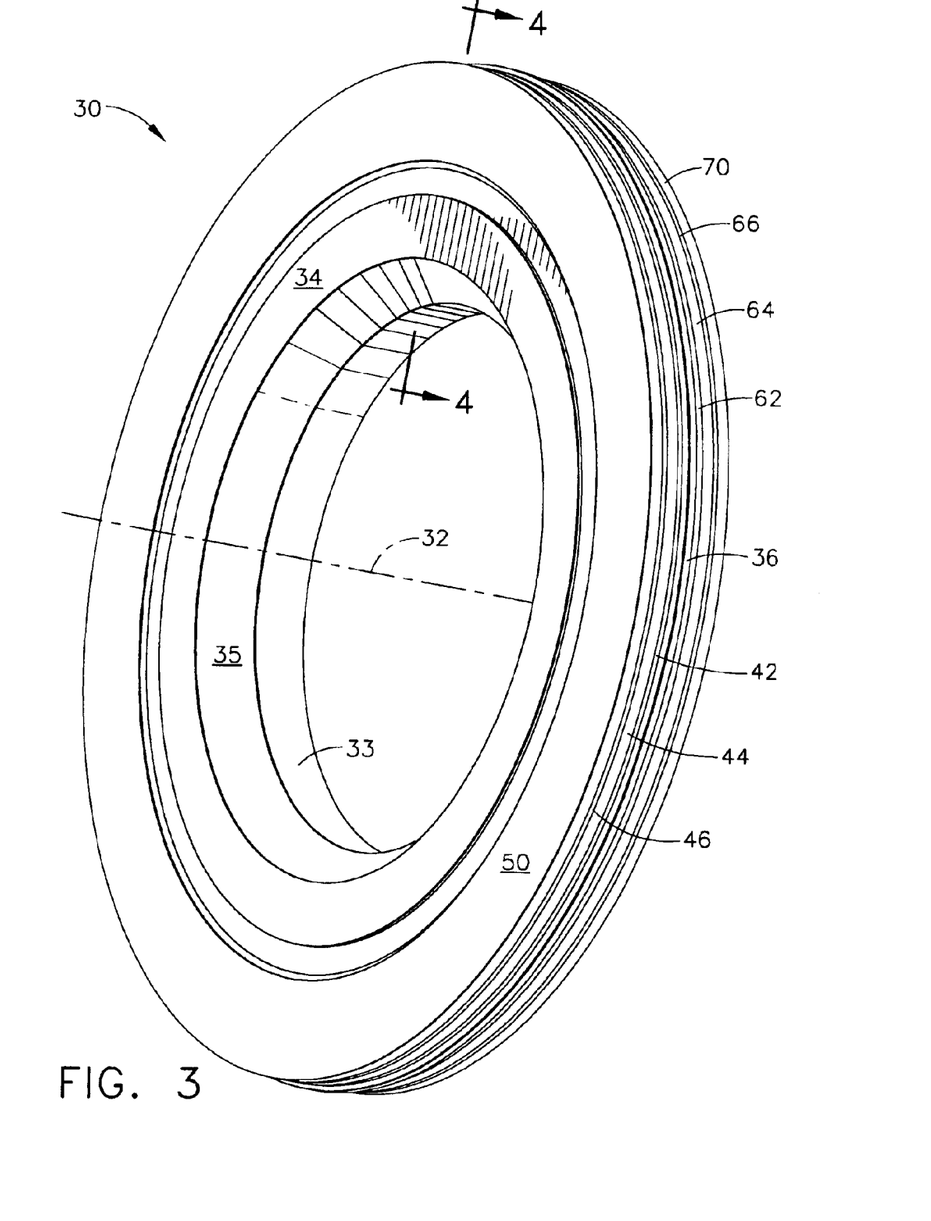
FIG. 3 is a perspective view of a composite seal rotor and/or composite stator contemplated by the present invention.
Figure 4:
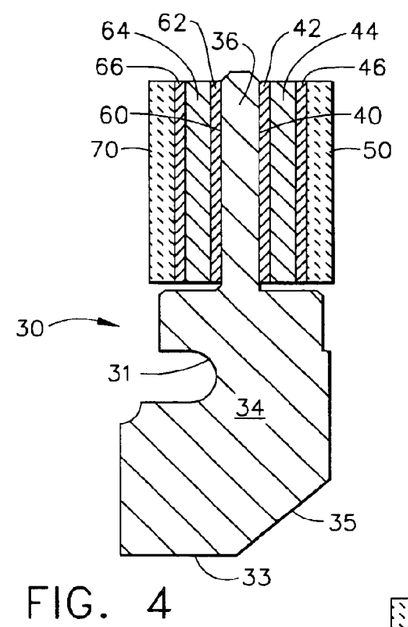
FIG. 4 is a cross-sectional view along line 4—4 of the composite seal rotor and/or composite stator of FIG. 3.

Referring to FIGS. 3 and 4, there are shown two views (perspective and cross sectional, respectively) of a composite seal rotor and/or composite stator contemplated by the present invention. The following description pertains specifically to a composite seal rotor; however, the design of the composite stator may be designed in a similar fashion.

A composite seal rotor 30 may be annular and symmetric about a centerline 32. When mounted in an engine, centerline 32 may be coincident with the centerline of the engine. Seal rotor 30 may have a metal base portion 34 with a radially extending flange 36. Base portion 34 may have an inner surface 33 that engages shaft 14. Base portion 34 may also have a slanted surface 35 as well as at least one conventional stress-relieving slot 31. Flange 36 may have axially facing surfaces 40, 60 that face in opposite directions. A ceramic ring 50 may be mounted to surface 40 by a braze joint comprised of a first braze ring 42, a metal ring 44, and a second braze ring 46. Metal ring 44 is preferably made of a metal having a low thermal expansion and high stiffness, preferably molybdenum. Likewise, a ceramic ring 70 may be mounted to surface 60 by a braze joint comprised of a third braze ring 62, a metal ring 64, and a fourth braze ring 66. Similar to metal ring 44, metal ring 64 is preferably made of a metal having a low thermal expansion and high stiffness, preferably molybdenum. Metal rings 44, 64 are preferably machined from molybdenum bar stock, such as that corresponding to ASTM B387-90. Bar stock molybdenum, which is extruded, has crystals that are elongated in a preferred orientation. Thus, metal rings 44, 64 advantageously have crystalline microstructure orientated perpendicular to surfaces 40 and 60. Such an orientation minimizes the stress caused by bending and twisting at the crystal boundaries in metal rings 44, 64. This minimization of stress reduces the chances of separation (cracking) of the molybdenum due to twisting and bending of the assembly. Ceramic rings 50 and 70 are preferably silicon nitride, $Si_3N_4$. Other ceramics that can be used are reaction bonded and sintered silicon carbide, SiC, reaction bonded and sintered WC, and beryllium oxide. Also, single isotope ceramics such as silicon 28 may be used. Additional applicable ceramics are kenimetal, alumina titanate, zirconia, cobalt oxide, entatite, fosterite, nickel oxide, alumina, silica zirconia, titanium diboride, boron nitride, aluminum nitride, ceramic eutectic composites, and metal matrix composites.

Base portion 34 can be preferably made of a standard metal such as SAE 4340 steel. Alternatively, base portion 34 may be made from molybdenum or titanium such as Ti-6-4 or any other metal suitable under a given set of service conditions.

Each of braze rings 42, 46, 62, 66 may be a silver and copper braze foil and may also include an active metal such as titanium. For example, the titanium may be coated onto a silver-copper braze foil. A preferred composition of the braze foil is silver in the range of 62 to 71% weight of the composition, copper in the range of 26.3 to 36% weight of the composition, and titanium in the range of 1.5 to 6.0% weight of the composition. Some standard silver-copper braze foils that can be used in the present invention are BVAg 8 or AWS 5.8, each coated with or containing titanium. The thickness of each of braze rings 42, 46, 62, 66 can be preferably in the range of 0.004 to 0.006 inch. Further, the thickness of each of ceramic rings 50 and 70 may be greater than or equal to 0.018 inch. Advantageously, thickness of molybdenum rings 44, 64 should be close to the thickness of ceramic rings 50, 70. Seal rotor 30 can be assembled using conventional brazing techniques.

Figure 5:
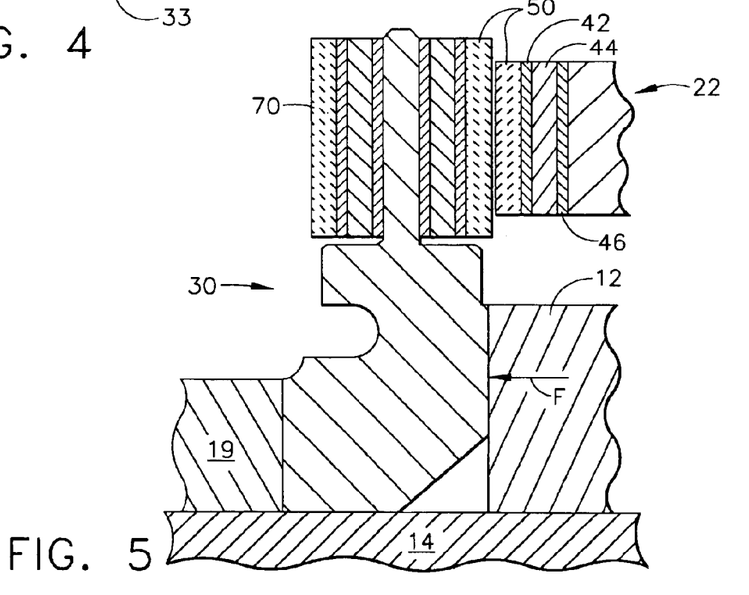
FIG. 5 is a plan, cross-sectional view of a face seal assembly mounted in an engine having a composite seal rotor and stator according to one embodiment of the present invention.

Referring now to FIG. 5, there is shown seal rotor 30 and seal stator 22 mounted in a gas turbine engine to form a face seal. An axially facing surface of ceramic ring 50 sealingly engages seal stator 22. The other ceramic ring 70 is not used for sealing but assures that seal rotor 30 is properly balanced. Coning may be caused by differential expansion of the different elements in a structure. This proper balance may be important in reducing and/or controlling the amount of coning between the rotor and stator.

Figure 8:
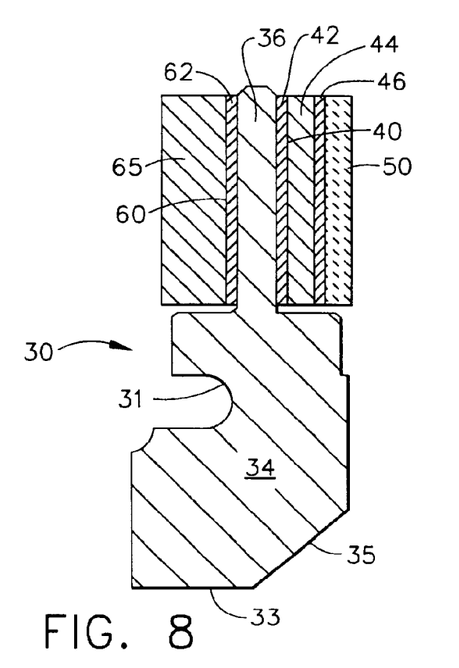
FIG. 8 is a cross-sectional view of a second alternative embodiment of the composite seal rotor of the present invention.

Referring to FIG. 8, there is shown a cross-sectional view of an alternative embodiment of the composite seal rotor and/or stator of the present invention. While the description below refers to a seal rotor, the design depicted in FIG. 8 may also be applicable for use as a seal stator design.

The non-sealing ceramic ring 70, which is not used for sealing purposes, along with the enclosed braze layer 66 and molybdenum 64 (see FIG. 4), may be replaced by a low expansion metal 65, such as molybdenum, to balance the thermal stresses. This low expansion metal 65 can be brazed to flange 36 by braze layer 62. This configuration is particularly useful for low rpm applications. Alternatively, low expansion metal 65 may be made of the same material as base portion 34 of rotor 30. Preferably, in this configuration, the area depicted by low expansion metal 65 in the Figure is made integral with base portion 34 as a single unit.

Seal rotor 30, as just described, is particularly useful to applications where space limits the axial dimension of the seal rotor to a range of 0.12 to 0.17 inches. Where more space is available and this range can grow to be between 0.17 to 0.22 inches, an alternative embodiment of the seal rotor 30 may be used as follows.

Figure 10:
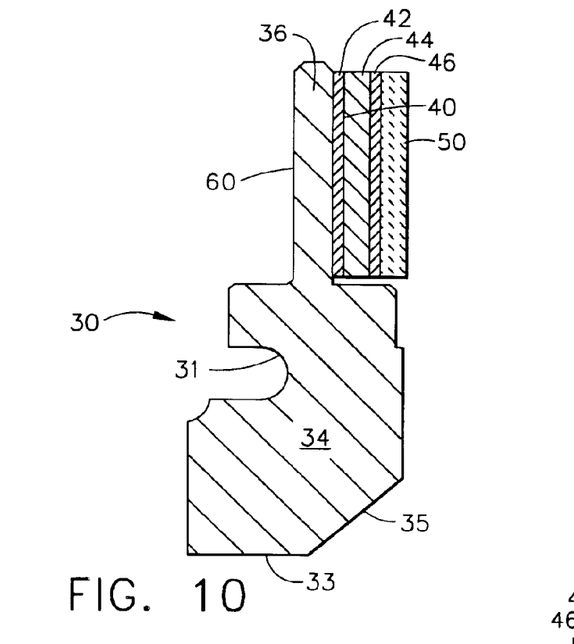
FIG. 10 is a cross-section view of a fourth alternative embodiment of the composite seal rotor of the present invention.

Referring to FIG. 10, there is shown a cross-sectional view of a second alternative embodiment of the composite seal rotor and/or stator of the present invention. While the description refers to a seal rotor, the design depicted in FIG. 10 may also be applicable for use as a seal stator design.

The non-sealing ceramic ring 70, which is not used for sealing purposes, along with the enclosed braze layer 66 and molybdenum ring 64 (see FIG. 4), may be removed from the seal rotor 30 or seal stator 22. This configuration is especially beneficial in applications where space limits the axial dimensions of the face seal assembly. However, the thermal radial taper that will occur in this embodiment of the present invention should be matched by the opposing sealing surface in order to create an effective seal.

Figure 6:
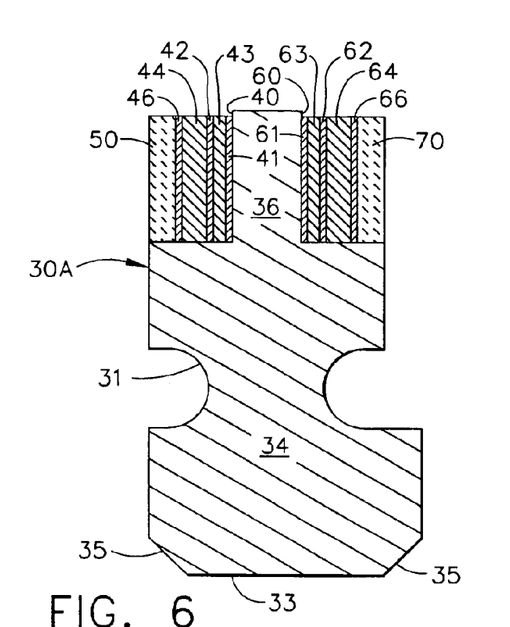
FIG. 6 is a cross-sectional view of an alternative embodiment of the composite seal rotor of the present invention.
Figure 7:
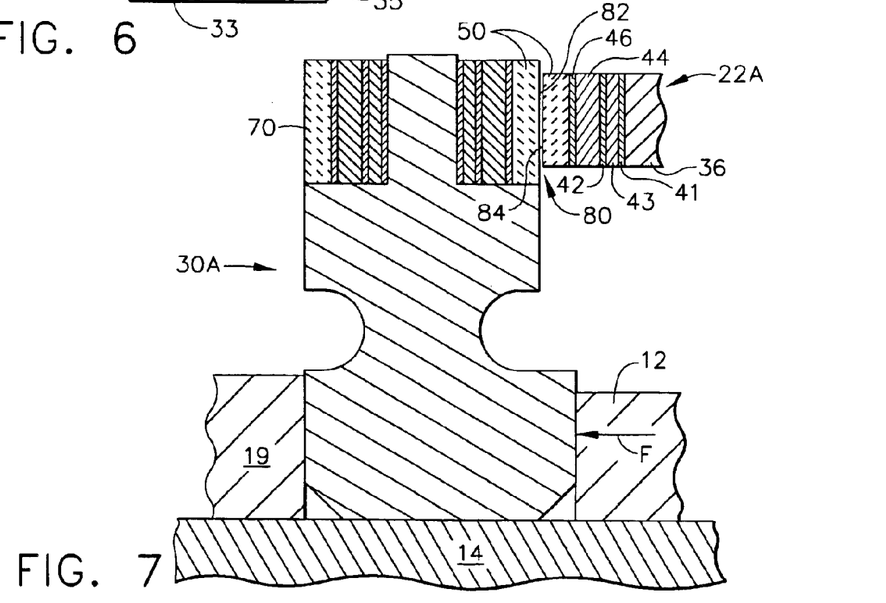
FIG. 7 is a plan, cross-sectional view of a face seal assembly mounted in an engine having the composite seal rotor and stator according to another embodiment of the present invention.

Referring now to FIGS. 6 and 7, there are shown two views of an alternative embodiment for a seal rotor 30A. More specifically, FIG. 6 shows seal rotor 30A having a design according to this alternative embodiment and FIG. 7 shows seal rotor 30A along with seal stator 22A, also having a design according to this alternative embodiment.

Like reference numerals among FIGS. 3–7 refer to like structures. Seal rotor 30A may be identical to seal rotor 30 except it additionally has a braze ring 41 and a nickel ring 43 between surface 40 and first braze ring 42 and, also, a braze ring 61 and a nickel ring 63 between surface 60 and third braze ring 62. Similarly, seal stator 22A may be identical to seal stator 22, except that it additionally has a braze ring 41 and a nickel ring 43 between surface 40 and first braze ring 42 and, also, a braze ring 61 and a nickel ring 63 between surface 60 and third braze ring 62.

The composition and thickness of braze rings 41 and 61 can be identical to that of the other braze rings 42, 46, 62, 66. Seal rotor 30A and seal stator 22A may be assembled using conventional brazing techniques.

Referring specifically to FIG. 7, there is shown seal rotor 30A and seal stator 22A mounted in a gas turbine engine to form a face seal 80. An axially facing surface 82 of ceramic ring 50 of seal rotor 30A may sealingly engage an axially facing surface 84 of ceramic ring 50 of seal stator 22. The other ceramic ring 70 is not used for sealing but can assure that seal rotor 30A and seal stator 22A are properly balanced.

The interlayer design described above may also be inverted in seal rotor 30 and/or seal stator 22. In other words, nickel rings 43, 63, which were brazed between flange 36 and metal layers 44, 64 may instead be brazed between ceramic rings 50, 70 and metal layers 44, 64. Thus, on the sealing side of seal rotor 30 and/or seal stator 22, for example, may be disposed flange 36, braze ring 41, metal layer 44, braze ring 42, nickel ring 43, braze ring 46 and ceramic ring 50.

Figure 9:
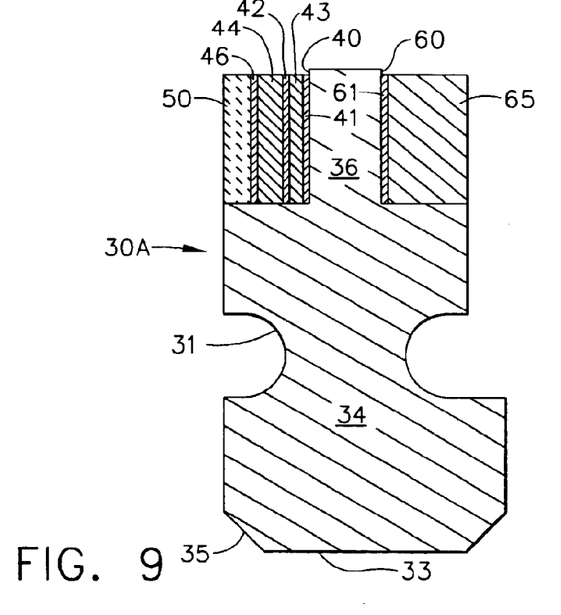
FIG. 9 is a cross-sectional view of a third alternative embodiment of the composite seal rotor of the present invention.

Alternatively, referring to FIG. 9, there is shown a cross-sectional view of an alternative embodiment of the composite seal rotor and/or stator of the present invention. While the description refers to a seal rotor, the design depicted in FIG. 9 may also be applicable for use as a seal stator design.

Ceramic ring 70, which is not used for sealing purposes, along with the enclosed brazes 62, 66, molybdenum ring 64 and nickel ring 63, may be replaced by a low expansion metal 65, such as molybdenum, to balance the thermal stresses. This low expansion metal 65 may be brazed to flange 36 by braze layer 61. Alternatively, low expansion metal 65 may be made of the same material as base portion 34 of rotor 30. Preferably, in this configuration, the area depicted by low expansion metal 65 in the Figure is made integral with base portion 34 as a single unit.

Figure 11:
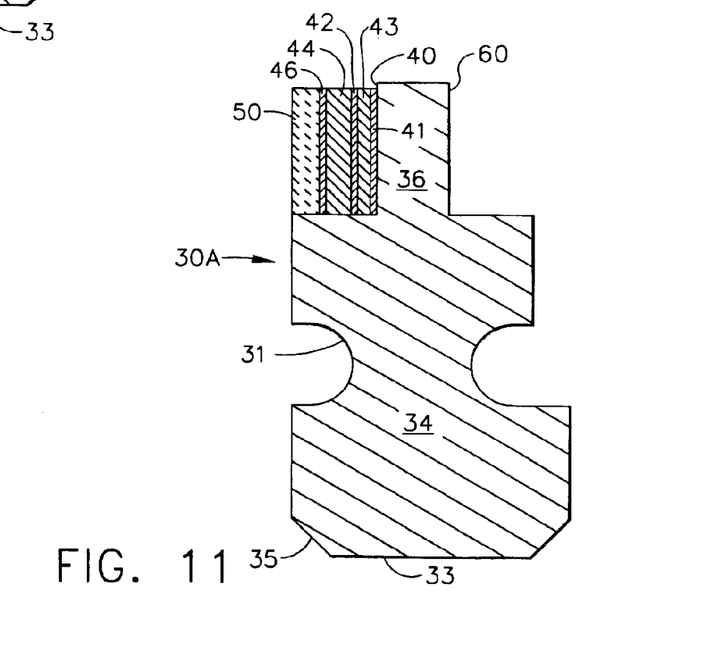
FIG. 11 is a cross-sectional view of a fifth alternative embodiment of the composite seal rotor of the present invention.

Referring to FIG. 11, there is shown a cross-sectional view of a second alternative embodiment of the composite seal rotor and/or stator of the present invention. While the description refers to a seal rotor, the design depicted in FIG. 11 may also be applicable for use as a seal stator design.

The non-sealing ceramic ring 70, which is not used for sealing purposes, along with the enclosed braze layer 66 and molybdenum ring 64 (see FIG. 6), may be removed from the seal rotor 30A and/or seal stator 22A. This configuration is especially beneficial in applications where space limits the axial dimensions of the face seal assembly. However, the thermal radial taper that will occur in this embodiment of the present invention should be matched by the opposing sealing surface in order to create an effective seal.

EXAMPLE 1

A computer model of seal rotor 30 was created with the seal having an inner diameter of 0.677 inch, and outer diameter of 1.58 inch and a total thickness of 0.13 inch. Allowing a minimum of 0.034 inches for the flange 36, only 0.048 inches is available for the braze assembly on each side of the flange 36. The ratio of the thickness of the ceramic ring to the molybdenum ring should be as close to 1 as possible and the ceramic ring minimum thickness should be greater than or equal to 0.018 inches. The model indicated a residual tensile stress of 67 Ksi whereas a ceramic/nickel/molybdenum/metal configuration had a residual tensile stress of 104 Ksi. The first configuration is better since the ceramic is a brittle material and the lower stresses of 67 Ksi results in a much lower probability of failure.

EXAMPLE 2

A computer model of seal rotor 30A was created with the seal having an inner diameter of 1.38 inch, an outer diameter of 2.13 inch and a total thickness of 0.19 inch. Of the total thickness of 0.19 inch, 0.060 inch is required for the flange 36. This leaves only 0.065 inches for the ceramic and interlayer assembly on each side. The preferred thicknesses are 0.020 inch for the ceramic rings, 0.005 inch for the braze rings, 0.020 inch for the molybdenum ring, and 0.010 inch for the nickel rings. The ratio of molybdenum ring thickness to the nickel ring thickness should be in the range 1.5/1 to 2.0/1 and the ceramic minimum thickness should be greater than or equal to 0.018 inch. In a preferred embodiment, the ceramic to molybdenum ratio should be as close to 1 as possible. This configuration gives a residual stress in the ceramic rings of 46 ksi. In contrast, an arrangement in which the position of the nickel and molybdenum rings are switched results in a residual stress of 93 ksi in the ceramic rings. This latter stress level is unacceptable as it will lead to a failure of the ceramic ring. Using the interlayer disclosed in U.S. Pat. No. 6,131,797 results in a residual stress of 92 ksi in the ceramic rings—also an unacceptable stress level. Again the first configuration is better since the ceramic is a brittle material and the lower stresses of 46 Ksi has a much lower probability of failure.

While the present invention has been described specifically with respect to the design of the seal rotor 30 or 30A, it should be understood that the invention also covers the design of seal stator 22 or 22A. More specifically, as discussed above, seal stator 22 or 22A may have a design similar to any of the embodiments described for seal rotor 30 or 30A. Alternatively, seal stator 20 or 22A may have the multi-layer design as described above, and seal rotor 30 or 30A may have a metallic or graphite design.

While the present invention has been described using an multi-layer configuration of ceramic/braze/molybdenum/braze, ceramic/braze/nickel/braze/molybdenum/braze or ceramic/braze/molybdenum/braze/nickel/braze or a single layer of low expansion metal on one or both sides of the seal rotor and/or seal stator, other metals may be substituted while still being within the scope of the present invention. For example, Ni may be replaced by any ductile metal, such as cobalt. Molybdenum may be replaced by any low thermal expansion metal having high stiffness, such as tungsten.

It should be understood, of course, that the foregoing relates to preferred embodiments of the invention and that modifications may be made without departing from the spirit and scope of the invention as set forth in the following claims.

We claim:

1. A face seal assembly for sealing between rotating components of a gas turbine engine mounted on a rotating shaft and a housing circumscribing the rotating components comprising:
    an annular seal rotor adapted for mounting to the shaft, the seal having:
        a metal rotor base portion having a radially extending rotor flange with first and second axially facing rotor surfaces, and
        a first rotor ring mounted to the first axially facing rotor surface of the rotor flange by a first rotor braze joint,
    an annular stator adapted for mounting to the housing, the stator having:
        a metal stator base portion having a radially extending stator flange with first and second axially facing stator surfaces, and
        a first stator ring mounted to the first axially facing stator surface of the stator flange by a first stator braze joint,
    wherein one of said first and second axially facing rotor surfaces sealingly engages one of said first and second axially facing stator surfaces.

2. The face seal assembly according to claim 1, further comprising:
    a second rotor ring mounted to the second axially facing rotor surface of the rotor flange by a second rotor braze joint; and
    a second stator ring mounted to the second axially facing stator surface of the stator flange by a second stator braze joint.

3. The face seal assembly according to claim 1, wherein the first rotor braze joint and the first stator braze joint comprises a molybdenum ring disposed between two braze rings.

4. The face seal assembly according to claim 1, wherein the second rotor braze joint and the second stator braze joint comprises a molybdenum ring disposed between two braze rings.

5. The face seal assembly according to claim 3, wherein the molybdenum rings are formed from molybdenum bar stock.

6. The face seal assembly according to claim 3, wherein the molybdenum rings have a crystalline microstructure orientated perpendicular to the first and second axially facing surfaces of the flange.

7. The face seal assembly according to claim 3, wherein each of the braze rings is a silver and copper braze foil.

8. The face seal assembly according to claim 7, wherein each of the braze foils includes titanium.

9. The face seal assembly according to claim 8, wherein each of the braze foils comprises silver in the range of 62 to 71% weight, copper in the range of 26.3 to 36% weight, and titanium in the range of 1.5 to 6.0% weight.

10. The face seal assembly according to claim 2, wherein the first and second rotor rings, and the first and second stator rings, are formed from a ceramic.

11. The face seal assembly according to claim 10, wherein the ceramic is silicon nitride.

12. The face seal assembly according to claim 2, wherein:
    the first rotor ring is formed from a ceramic and the second rotor ring is formed from low expansion metal; and the first rotor braze joint is a single braze foil.

13. The face seal assembly according to claim 2, wherein:
the first stator ring is formed from a ceramic and the second stator ring is formed from low expansion metal; and
the first stator braze joint is a single braze foil.

14. A face seal assembly for sealing between rotating components of a gas turbine engine mounted on a rotating shaft and a housing circumscribing the rotating components comprising:
an annular seal rotor adapted for mounting to the shaft, the seal rotor having:
a metal rotor base portion having a radially extending rotor flange with first and second axially facing rotor surfaces,
a first rotor braze ring coupling the first axially facing rotor surface of the rotor flange to a first metal rotor ring,
a second rotor braze ring coupling the first metal rotor ring to a second metal rotor ring,
a third rotor braze ring coupling the second metal rotor ring to a first sealing rotor ring; and
an annular stator adapted for mounting to the housing, the stator having:
a metal stator base portion having a radially extending stator flange with first and second axially facing stator surfaces,
a first stator braze ring coupling the first axially facing stator surface of the stator flange to a first metal stator ring,
a second stator braze ring coupling the first metal stator ring to a second metal stator ring,
a third stator braze ring coupling the second metal stator ring to a first sealing stator ring;
wherein the first axially facing rotor surface sealingly engages the first axially facing stator surface.

15. The seal assembly according to claim 14, further comprising:
a fourth rotor braze ring coupling the second axially facing rotor surface of the rotor flange to a third metal rotor ring;
a fifth rotor braze ring coupling the third metal rotor ring to a fourth metal rotor ring;
a sixth rotor braze ring coupling the fourth metal rotor ring to a second rotor sealing ring;
a fourth stator braze ring coupling the second axially facing stator surface of the stator flange to a third metal stator ring;
a fifth stator braze ring coupling the third metal stator ring to a fourth metal stator ring; and
a sixth stator braze ring coupling the fourth metal stator ring to a second stator sealing ring.

16. The face seal assembly according to claim 15, wherein:
the first metal rotor ring, the third metal rotor ring, the first metal stator ring and the third metal stator ring are made of nickel; and
the second metal rotor ring, the fourth metal rotor ring, the second metal stator ring and the fourth metal stator ring are made of molybdenum.

17. The face seal assembly according to claim 15, wherein:
the first metal rotor ring, the third metal rotor ring, the first metal stator ring and the third metal stator ring are made of molybdenum; and
the second metal rotor ring, the fourth metal rotor ring, the second metal stator ring and the fourth metal stator ring are made of nickel.

18. The face seal assembly according to claim 14, wherein the molybdenum rotor rings and the molybdenum stator rings are formed from molybdenum bar stock.

19. The face seal assembly according to claim 14, wherein the molybdenum rotor rings and the molybdenum stator rings have a crystalline microstructure orientated perpendicular to the first and second axially facing surfaces of the flange.

20. The face seal assembly according to claim 14, wherein each of the braze rings is a silver and copper braze foil.

21. The face seal assembly according to claim 20, wherein each of the foils has titanium.

22. The face seal assembly according to claim 21, wherein each of the braze foils comprises silver in the range of 62 to 71% weight, copper in the range of 26.3 to 36% weight, and titanium in the range of 1.5 to 6.0% weight.

23. The face seal assembly according to claim 14, wherein both first and second rotor sealing rings, and both first and second stator sealing rings, are formed from a ceramic.

24. The face seal assembly according to claim 23, wherein the ceramic is silicon nitride.

25. The face seal assembly according to claim 15, wherein the first rotor sealing ring is formed from a ceramic and the third metal rotor ring, fifth rotor braze ring, fourth metal rotor ring, sixth rotor braze ring and second rotor sealing ring are replaced by a low expansion metal.

26. The face seal assembly according to claim 14, wherein the first stator sealing ring is formed from a ceramic and the third metal stator ring, fifth stator braze ring, fourth metal stator ring, sixth stator braze ring and second stator sealing ring are replaced by a low expansion metal.

27. A face seal assembly for sealing between rotating components of a gas turbine engine mounted on a rotating shaft and a housing circumscribing the rotating components comprising:
an annular seal stator adapted for mounting to the housing, the seal stator having
a metal stator base portion having a radially extending stator flange with first and second axially facing stator surfaces,
a first stator ring mounted to the first axially facing stator surface of the stator flange by a first stator braze joint, and
a second stator ring mounted to the second axially facing stator surface of the stator flange by a second stator braze joint; and
an annular seal rotor adapted for mounting to the shaft and having an axially facing surface that sealingly engages one of the first stator ring and the second stator ring.

28. The face seal assembly according to claim 27, wherein the first and second stator rings are formed from a ceramic.

29. The face seal assembly according to claim 27, wherein the first stator ring is formed from a ceramic and said second stator ring is formed from low expansion metal.

30. A seal stator for use in a face seal assembly for sealing between rotating components of a gas turbine engine mounted on a rotating shaft and a housing circumscribing the rotating components comprising:
a metal stator base portion having a radially extending stator flange with first and second axially facing stator surfaces;
a first ring mounted to the first axially facing stator surface of the stator flange by a first braze joint; and
a second ring mounted to the second axially facing stator surface of the stator flange by a second braze joint.

31. The seal stator according to claim 30, wherein each of the braze joints comprises a molybdenum ring disposed between two braze rings.

32. The seal stator according to claim 31, wherein the molybdenum rings are formed from molybdenum bar stock.

33. The seal stator according to claim 31, wherein the molybdenum rings have a crystalline microstructure orientated perpendicular to the first and second axially facing surfaces of the flange.

34. The seal stator according to claim 31, wherein each of the braze rings is a silver and copper braze foil.

35. The seal stator according to 34, wherein each of the braze foils includes titanium.

36. The seal stator according to 35, wherein each of the braze foils comprises silver in the range of 62 to 71% weight, copper in the range of 26.3 to 36% weight and titanium in the range of 1.5 to 6.0% weight.

37. The seal stator according to claim 31, wherein both first and second stator rings are formed from a ceramic.

38. The seal stator according to claim 37, wherein the ceramic is silicon nitride.

39. The seal stator according to claim 31, wherein the first stator ring is formed from a ceramic and the second stator ring is formed from low expansion metal.

40. A seal stator for use in a face seal assembly for sealing between rotating components of a gas turbine engine mounted on a rotating shaft and a housing circumscribing the rotating components comprising:
a metal stator base portion having a radially extending stator flange with first and second axially facing stator surfaces;
a first braze ring coupling the first axially facing stator surface of the stator flange to a first metal ring;
a second braze ring coupling the first metal ring to a second metal ring; and
a third braze ring coupling the second metal ring to a first sealing ring.

41. The seal stator according to claim 40, further comprising:
a fourth braze ring coupling the second axially facing stator surface of the stator flange to a third metal ring;
a fifth braze ring coupling the third metal ring to a fourth metal ring; and
a sixth braze ring coupling the fourth metal ring to the second sealing ring.

42. The seal stator according to claim 41, wherein:
the first metal ring and the third metal ring are made of nickel; and
the second metal ring and the fourth metal ring are made of molybdenum.

43. The seal stator according to claim 41, wherein:
the first metal ring and the third metal ring are made of molybdenum; and
the second metal ring and the fourth metal ring are made of nickel.

44. The seal stator according to claim 40, wherein the molybdenum rings are formed from molybdenum bar stock.

45. The seal stator according to claim 40, wherein the molybdenum rings have a crystalline microstructure orientated perpendicular to the first and second axially facing surfaces.

46. The seal stator according to claim 40, wherein each of the braze rings is a silver and copper braze foil.

47. The seal stator according to claim 46, wherein each of the braze foils includes titanium.

48. The seal stator according to claim 47, wherein each of the braze foils comprises silver in the range of 62 to 71% weight, copper in the range of 26.3 to 36% weight and titanium in the range of 1.5 to 6.0% weight.

49. The seal stator according to claim 40, wherein both first and second sealing rings are formed from a ceramic.

50. The seal stator according to claim 49, wherein the ceramic is silicon nitride.

51. The seal stator according to claim 40, wherein the first sealing ring is formed from a ceramic and a low expansion metal is brazed to second axially facing stator surface.

52. A method for sealingly engaging rotating components of a gas turbine engine mounted on a rotating shaft with a housing circumscribing the rotating components, comprising:
mounting an annular seal rotor onto the shaft, the seal rotor having metal rotor base portion with a radially extended rotor flange having first and second axially facing rotor surfaces;
mounting a first rotor ring to the first axially facing rotor surface of the rotor flange by a first rotor braze joint;
mounting an annular stator adapted to the housing, the stator having a metal stator base portion with a radially extended stator flange having first and second axially facing stator surfaces;
mounting a first stator ring to the first axially facing stator surface of the stator flange by a first stator braze joint; and
sealingly engaging one of said first and second axially facing rotor surfaces with one of said first and second axially facing stator surfaces.

53. The method according to claim 52, further comprising:
mounting a second rotor ring to the second axially facing rotor surface of the rotor flange by a second rotor braze joint; and
mounting a second stator ring to the second axially facing stator surface of the stator flange by a second stator braze joint.

54. The method according to claim 53, wherein the first rotor braze joint and the first stator braze joint comprise a molybdenum ring disposed between two braze rings.

55. The method according to claim 54, wherein the second rotor braze joint and the second stator braze joint comprise a molybdenum ring disposed between two braze rings.

56. The method according to claim 53, wherein the first rotor braze joint and the first stator braze joint comprise a molybdenum ring disposed between two braze rings to form a molybdenum subcomponent, and a nickel ring disposed between a third braze ring and the molybdenum subcomponent.

57. The method according to claim 56, wherein the second rotor braze joint and the second stator braze joint comprise a molybdenum ring disposed between two braze rings to form a molybdenum subcomponent, and a nickel ring disposed between a third braze ring and the molybdenum subcomponent.

* * * * *